United States Patent
Arneson et al.

[11] Patent Number: 6,147,646
[45] Date of Patent: Nov. 14, 2000

[54] METHOD AND SYSTEM FOR COLLECTING INFORMATION ABOUT A PLURALITY OF EMITTERS

[75] Inventors: Steven H. Arneson, Mesa, Ariz.; Mahir A. Nayfeh, Catonsville, Md.

[73] Assignee: Motorola, Inc., Schaumburg, Ill.

[21] Appl. No.: 09/385,887

[22] Filed: Aug. 30, 1999

[51] Int. Cl.⁷ ........................................ G01S 5/02
[52] U.S. Cl. .................... 342/417; 342/13; 342/149
[58] Field of Search ........................... 342/13–14, 16, 342/149, 417, 423, 427

[56] References Cited

U.S. PATENT DOCUMENTS

| | | | |
|---|---|---|---|
| 3,921,171 | 11/1975 | Strother et al. | 343/16 M |
| 4,217,580 | 8/1980 | Lowenschuss | 343/5 DP |
| 4,876,546 | 10/1989 | Koerner | 342/15 |
| 5,265,121 | 11/1993 | Stewart | 375/99 |
| 5,657,027 | 8/1997 | Guymon | 342/445 |
| 5,659,319 | 8/1997 | Rost et al. | 342/36 |
| 5,774,087 | 6/1998 | Rose | 342/13 |
| 6,026,125 | 2/2000 | Larrick et al. | 375/295 |

*Primary Examiner*—Thomas H. Tarcza
*Assistant Examiner*—Dao L. Phan
*Attorney, Agent, or Firm*—Frank J. Bogacz

[57] ABSTRACT

A sensor performs input pulse deinterleaving based on an angle of arrival (AOA) of each sensed pulse. An AOA determination unit determines an AOA for each received pulse. The pulses are then sorted based on AOA into a number of AOA bins. The data within each bin is then analyzed to determine whether it corresponds to an emitter of interest. Bin data corresponding to emitters of interest are then transmitted to a remote processing facility for additional processing.

19 Claims, 3 Drawing Sheets

METHOD AND SYSTEM FOR COLLECTING INFORMATION ABOUT A PLURALITY OF EMITTERS

FIELD OF THE INVENTION

The invention relates generally to systems for monitoring emitters of electromagnetic energy within a predetermined region from a remote platform and, more specifically, to a system architecture that is capable of monitoring emitters that utilize pulse agility techniques.

BACKGROUND OF THE INVENTION

Many applications exist where a plurality of emitters of electromagnetic energy need to be detected and monitored from a single remote location. For example, a military satellite may be used to sense terrestrial-based enemy radar systems in a predetermined region. In such an application, the remote sensor generally receives a number of electromagnetic pulses generated by the plurality of emitters. The electromagnetic pulses are then sorted and analyzed to derive information about the emitters. Some of the emitters sensed by the sensor may be of high interest to the system operator while others are of relatively low interest.

In the past, pulses were sorted (i.e., deinterleaved) based on measured transmission characteristics of the pulses. That is, each received pulse was analyzed to determine one or more transmission characteristics of the pulse (e.g., frequency, pulse-width, pulse repetition interval, modulation type, etc.) and the resulting information was used to associate the pulse with a particular emitter. The deinterleaved information was then analyzed further to determine more specific information about the identified emitters. Modern emitters (particularly modern radar transmitters), however, are increasingly utilizing pulse agility techniques to avoid detection, jamming, and countermeasure activities. Pulse agility generally refers to the process of changing one or more transmission characteristics from pulse to pulse or from pulse group to pulse group. As can be appreciated, pulses received from a plurality of pulse agile emitters are considerably more difficult, if not impossible, to deinterleave using these past techniques.

To exacerbate the problem, many sensor platforms (e.g., satellite-based sensors) include limited on-board processing capability and must therefore transfer collected data to a remote processing facility to deinterleave and process the received pulse information. For example, satellite-based sensors generally transfer collected emitter information to a ground based processing station to perform the required processing. The links used to carry the collected data to the processing facility (e.g., a satellite downlink) are generally limited in bandwidth and are thus not capable of handling the increased amount of data generated while sensing pulse agile emitters.

Therefore, there is a need for a method and apparatus that is capable of efficiently and practically sensing a plurality of emitters that can include one or more pulse agile emitters. The method and apparatus will preferably be commensurate with the limited processing power and/or data link capacity associated with some current sensor platforms.

DETAILED DESCRIPTION OF A PREFERRED EMBODIMENT

The present invention relates to a sensor system that is capable of efficiently sensing a plurality of remote emitters that can include one or more pulse agile emitters. The principles of the invention are particularly advantageous in systems utilizing a remote sensor platform having limited processing power and a relatively low link bandwidth to a corresponding processing facility. The system uses angle-of-arrival measurements or the like to sort detected pulses received from a plurality of remote emitters. The pulses are sorted into groups that each correspond to a probable single emitter. The pulses within the pulse groups can then be further processed within the sensor to identify groups corresponding to emitters of high interest (e.g., high agility emitters). Information relating to the identified emitters can then be transferred to a remote processing facility (if one exists) for further processing. Collected data relating to low interest emitters is ignored or discarded. Thus, the amount of data to be transferred to the remote processing facility is reduced considerably and can be transferred more rapidly via a limited bandwidth link.

Figure 1:
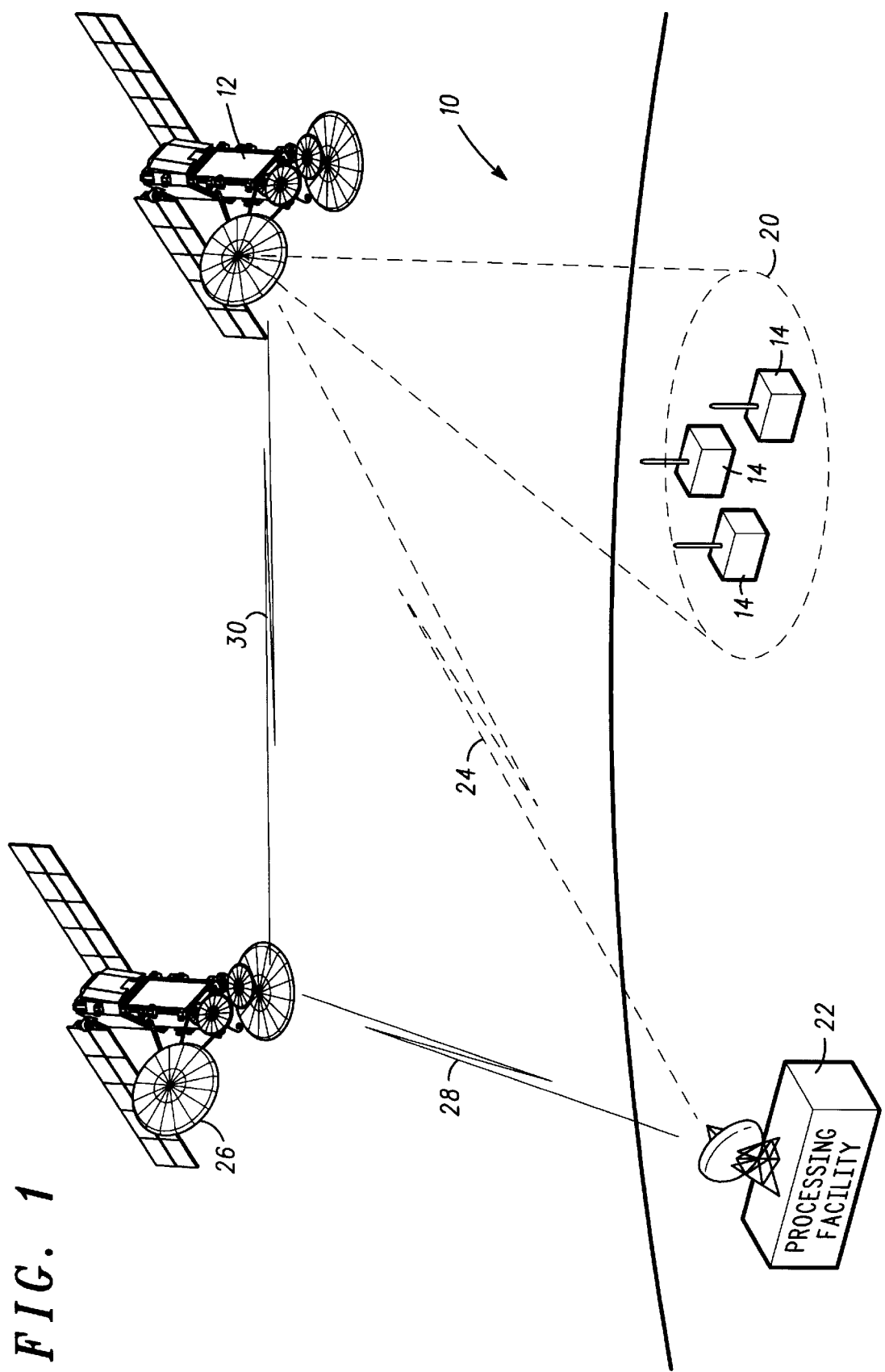
FIG. 1 is a diagram illustrating a sensor system in accordance with one embodiment of the present invention.

FIG. 1 is a diagram illustrating a sensor system 10 in accordance with one embodiment of the present invention. The sensor system 10 includes a satellite-based sensor 12 that is capable of sensing a plurality of terrestrial emitters 14 that reside within (or near) a footprint 20 of the sensor 12 and that transmit within the bandwidth of an on-board receiver in the sensor 12. In general, the plurality of emitters 14 can include virtually any number of emitters and can include one or more pulse agile radar systems. The system 10 also includes a terrestrial processing facility 22 that can be located inside or outside the footprint 20. In the illustrated embodiment, the processing facility 22 is located outside the footprint 20 and is coupled to the sensor 12 via either a direct link 24 or one or more intermediate satellites 26 with associated links 28, 30. As can be appreciated, the data transfer capacity of the links 24, 28, 30 will generally be limited.

The plurality of emitters 14 will each transmit electromagnetic pulses in accordance with a corresponding system algorithm. For example, emitters using pulse agility techniques will transmit pulses (or pulse groups) having transmission parameters that vary in a predetermined manner. That is, any combination of pulse center frequency, pulse-width, pulse repetition interval, modulation type, or any other transmission parameter can vary from pulse to pulse. The sensor 12 receives the transmitted pulses within an on-board receiver and proceeds to process the pulses within its on-board circuitry. After appropriate on-board processing, some of the collected information is transferred to the terrestrial processing facility 22 for further processing.

Figure 2:
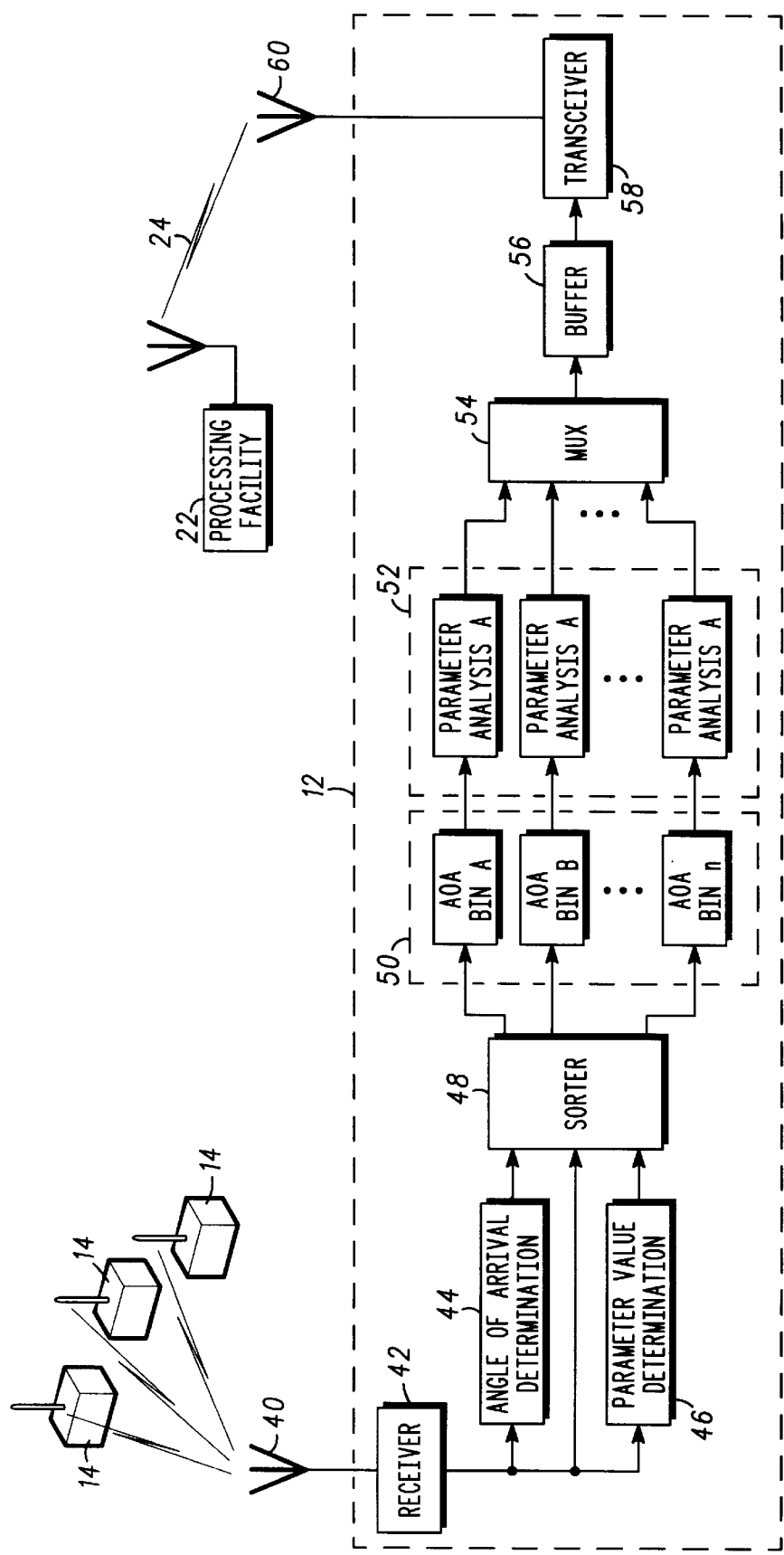
FIG. 2 is a block diagram illustrating the sensor system of FIG. 1 in greater detail.

FIG. 2 is a block diagram illustrating the system 10 of FIG. 1 in more detail. It should be appreciated that the blocks illustrated in FIG. 2 are functional in nature and do not necessarily correspond to discrete hardware devices. For example, some or all of the block functions can be implemented in software within one or more on-board digital processors, such as a general purpose microprocessor, a digital signal processor, a reduced instruction set computer (RISC), or a complex instruction set computer (CISC).

As illustrated in FIG. 2, the sensor 12 includes: a first antenna 40, a receiver 42, an AOA determination unit 44, a parameter value determination unit 46, a sorter 48, a plurality of AOA bins 50, a plurality of parameter analysis units 52, a multiplexer 54, a buffer memory 56, a transceiver 58, and a second antenna 60. The first antenna 40 senses the pulses from the plurality of emitters 14 and delivers the pulses to the receiver 42. The receiver 42 processes the pulses to convert them to a format that is ore suitable for additional signal processing. For example, the receiver 42 will generally convert the frequency of each pulse to an intermediate frequency (IF) and digitize each pulse to enable subsequent digital processing. Each received pulse output by the receiver 42 is then delivered to the AOA determination unit 44, the parameter value determination unit 46, and the sorter 48. The AOA determination unit 44 analyzes each pulse to determine an AOA for the pulse and transfers the AOA information to the sorter 48. Similarly, the parameter value determination unit 46 analyzes each pulse to determine at least one parameter value corresponding to the pulse and transfers the at least one parameter value to the sorter 48. The sorter 48 uses the AOA information received from the AOA determination unit 44 to sort the corresponding pulse information according to AOA. The AOA bins 50 each comprise a memory unit (such as, for example, a dedicated register or RAM portion) that corresponds to a particular AOA range associated with a specific terrestrial emitter. The sorter 48 checks the AOA information relating to a present pulse and determines whether the AOA falls within the AOA range of a particular bin. If so, the sorter 48 stores the corresponding pulse information into the appropriate bin. If the AOA information does not fall within the AOA range of a particular existing bin, the pulse information is delivered to a new bin and an AOA range for the new bin is developed. The AOA range for a bin is determined based upon the measured AOA value of a pulse assigned to the bin and the known measurement accuracy of the system.

Each of the parameter analysis units 52 are operative for analyzing parameters associated with the pulses stored in a corresponding AOA bin to determine whether the emitter associated with the bin fits a predetermined parameter value criterion (i.e., the emitter is an "emitter of interest"). For example, in one embodiment of the invention, the parameter analysis units 52 check information within the AOA bins 50 to identify emitters that hop more than a predetermined frequency step (e.g., 100 MHz) from pulse to pulse. Other parameter value criteria, including significantly more complex criteria involving multiple parameters, are also possible. Once an emitter of interest has been identified, or after a delay period to allow more data to be collected, the pulse related data stored in the corresponding AOA bin is transferred to the multiplexer 54 which multiplexes the data to a buffer memory 56. The buffer memory 56 then outputs the data to the transceiver 58 at a data rate commensurate with the bandwidth of the link 24 between the sensor 12 and the processing facility 22. The processing facility 22 uses the data received from the sensor 12 to perform further analyses to extract more detailed information regarding the corresponding emitter of interest. For example, the processing facility 22 can determine pulse repetition intervals, unintentional modulation on pulse, extrapolate operational modes, etc., or excise pulses erroneously included in the single emitter AOA grouping.

By initially sorting based on AOA (or another parameter indicative of the relative location of an emitter with respect to the sensor 12), the invention provides a very computationally efficient first layer of deinterleaving of individual emitters from a large group of individual detections. Thus, the deinterleaving can be done at the sensor platform itself, even if the platform has limited computational resources. In addition, the first layer of processing is immune to emitter transmission parameter agility and the associated computational complexities. Furthermore, because a significant amount of collected data can be ignored/discarded in accordance with one embodiment of the present invention, significantly less bandwidth-time is necessary to transfer collected data from the sensor location to the remote processing facility. The invention is thus capable of providing a multiple orders of magnitude reduction in the amount of processing required to capture and store information about a plurality of emitters. Significantly, the invention is also capable of collecting and capturing information for especially agile emitters thus allowing the location and detailed signal characteristics of the emitters to be determined in a manner that has not heretofore been possible.

As described above, the AOA determination unit 44 is operative for determining the angle from which a pulse was received by the sensor 12. In one embodiment, well known AOA monopulse direction finding techniques are used to determine the incoming angle of the pulse. The AOA is thus specified in terms of a clock angle (i.e., N) and a cone angle (i.e., 2) from the sensor 12 to the corresponding emitter. Other methods for determining pulse AOA are also possible.

Figure 3:
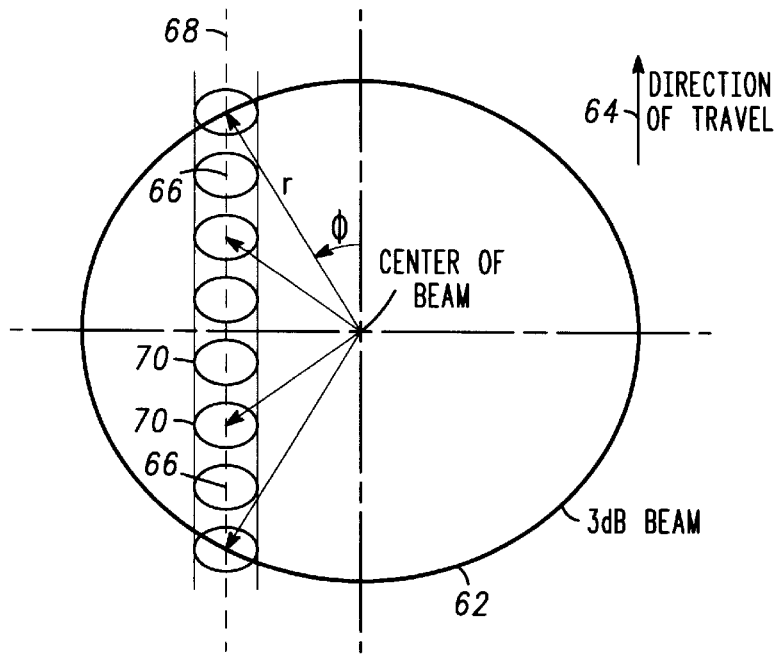
FIG. 3 is a diagram illustrating an angle of arrival track formed within a receiver footprint in accordance with one embodiment of the present invention.

In addition to determining the relative angle of an emitter with respect to the sensor 12, compensation is also required for the relative movement of the sensor receive beam with respect to the emitter from pulse to pulse. That is, because the sensor 12 is moving with respect to the emitter, and also because the receive beam itself may be scanned during the pulse detection process, the measured AOA information will change from pulse to pulse for a stationary terrestrial emitter. Thus, appropriate compensation is needed to account for the relative movement. In conceiving of the present invention, it was appreciated that the time separated detections of the sensor 12 will generally describe an easily determined track of clock and cone angles as the receive beam moves across the ground. For example, FIG. 3 illustrates a receive beam footprint 62 traveling in a direction 64 along the earth's surface. As shown, the detected pulses 66 corresponding to a single stationary terrestrial emitter form an AOA track 68 within the footprint 62. That is, each detected pulse 66 corresponding to the single emitter has a different AOA with respect to the receive beam because it occurs at a different time. In addition, each pulse has a corresponding AOA error boundary 70 indicating a range of possible AOA measurement values that might result from the pulse due to measurement errors within the underlying equipment.

The AOA determination unit 44, knowing the precise time that each pulse was received by the antenna 40 and the speed of the receive beam with respect to the earth's surface, can determine a range of possible AOA values (i.e., an AOA error boundary) that a subsequent pulse from a particular location on the earth (i.e., a particular emitter) would fall into. Thus, if a pulse received at a particular time falls into the corresponding AOA range, it is deemed by the AOA determination unit 44 to have originated from the associated emitter. The AOA information for that pulse is then corrected for the movement of the receive beam before it is delivered to the sorter 48. Therefore, the AOA measurements delivered to the sorter 48 corresponding to a single stationary emitter do not change significantly from pulse to pulse (except for small changes due to equipment error). The corresponding pulse data can thus be binned relatively easily by the sorter 48 by comparing the received AOA information to the AOA range of each AOA bin. Alternatively, the AOA determination unit 44 can deliver the raw AOA data corresponding to a particular pulse to the sorter 48 and the sorter 48 can perform the necessary predictions/corrections needed to identify an appropriate bin.

The parameter value determination unit 46, as discussed above, extracts specific parameter values from each pulse for use in later processing/analysis. For example, some parameters for which values might be extracted include pulse width, time of arrival, frequency, amplitude, repetition intervals, modulation, or a number of other identifying characteristics. The parameter value determination unit 46 preferably outputs a single parameter descriptor word (PDW) to the sorter 48 for each received pulse including all of the parameter values extracted from the pulse arranged in a predetermined data format. Techniques for performing parameter value extraction are generally well known in the art.

The present invention capitalizes to some extent upon the real time and pipelined capabilities of modern receivers to collect information from a plurality of sources. It should be appreciated that the receiver 42, the AOA determination unit 44, and the parameter value determination unit 46 (or any combination thereof) illustrated in FIG. 2 can be included within a single receiver apparatus. For example, a single AOA monopulse receiver can be used which provides both measured AOA information and a PDW for each received pulse. Similarly, pulse search receivers are available that provide activity search detection over an instantaneous frequency range of 1 GHz or more. Upon detecting a pulse, these receivers rapidly tune delayed input and then activate parameter measurement devices that provide a PDW for the pulse in real time.

Figure 4:
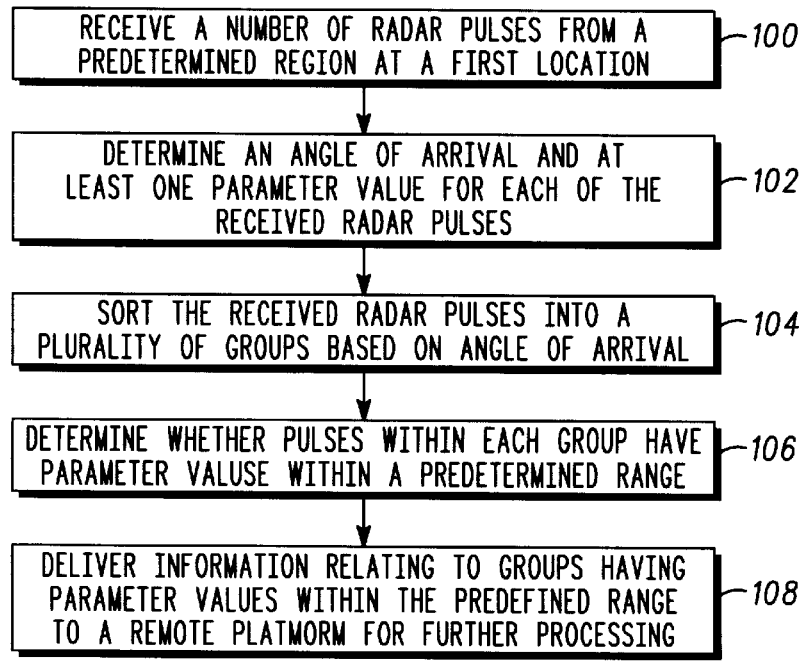
FIG. 4 is a flowchart illustrating a method in accordance with one embodiment of the present invention.

FIG. 4 is a flowchart illustrating a method in accordance with one embodiment of the present invention. A number of radar pulses are first received at a first location (step 100). The received radar pulses originate from a predetermined region that generally corresponds to the coverage area of the receive antenna. For each received pulse, an AOA within the beam's coverage area and at least one parameter value is measured (step 102). The received pulses are sorted into a plurality of groups based on the corresponding AOA values (step 104). The groups are then analyzed to determine whether the parameter values associated with each group fit a predetermined criterion (step 106) and thus correspond to an emitter of interest. If a group is found to correspond to an emitter of interest, information relating to the group is delivered to a remote processing facility for further processing (step 108).

It should be appreciated that the principles of the present invention are not limited to the specific use of AOA to sort incoming pulses. That is, any indicator of relative position between the sensor or sensors 12 and a particular emitter can be used as a sorting value in accordance with the present invention. Various other methods of monopulse AOA, such as interferometry, phased arrays, or superresolution techniques using multiple sensor arrays are also applicable. In addition, it should be understood that the identification and discarding of data that does not correspond to an emitter of interest is of primary importance in systems that utilize a low capacity link to a remote processing facility. This step is generally not required in a system having access to a link with adequate bandwidth to transmit all collected data. Likewise, the step will not generally be required in a system that performs all signal analysis at the sensor itself (and hence does not transfer collected data to a remote processing facility).

In addition, the principles of the present invention can be modified to collect information on mobile emitters in addition to stationary emitters. That is, location prediction algorithms can be implemented to estimate a subsequent position of a mobile emitter based upon previous information collected on the emitter. The AOA calculation can then take the estimated movement into account in determining the AOA value for the pulse. Furthermore, it should be appreciated that the principles of the present invention are not limited to use with satellite-based sensor platforms. For example, sensors can be carried by aircraft, ground-based vehicles, or water borne vessels, or they can be located in stationary terrestrial facilities.

Although the present invention has been described in conjunction with its preferred embodiments, it is to be understood that modifications and variations may be resorted to without departing from the spirit and scope of the invention as those skilled in the art readily understand. For example, parameter value extraction for a received pulse can be performed after pulse sorting in accordance with the present invention (e.g., in the parameter analysis units 52). Such modifications and variations are considered to be within the purview and scope of the invention and the appended claims.

What is claimed is:

1. A method for use in collecting information about a plurality of emitters, said method comprising the steps of:

receiving electromagnetic pulses from a plurality of remote emitters at a first location;

measuring, for each of said electromagnetic pulses, a relative position of a corresponding emitter with respect to said first location;

sorting said electromagnetic pulses into a plurality of groups based on measured relative position information, each of said plurality of groups corresponding to a particular emitter within said plurality of remote emitters;

analyzing electromagnetic pulses within each of said plurality of groups to identify a group corresponding to an emitter having a predetermined transmission characteristic; and transmitting data about the identified group to a remote processing station via a communication link between said first location and said remote processing station, wherein said remote processing station is operative for analyzing said data to derive additional information about the corresponding emitter.

2. The method, as claimed in claim 1, wherein:

said plurality of remote emitters includes a plurality of radar transmitters.

3. The method, as claimed in claim 2, wherein:

said plurality of radar transmitters includes at least one radar transmitter utilizing pulse agility techniques.

4. The method, as claimed in claim 1, wherein:

said step of measuring a relative position includes measuring an angle of arrival (AOA) for each of said electromagnetic pulses.

5. The method, as claimed in claim 4, wherein:

said step of sorting includes sorting said electromagnetic pulses into AOA bins.

6. The method, as claimed in claim 1, wherein:

said step of measuring a relative position includes compensating for relative movement between said corresponding emitter and said first location.

7. The method, as claimed in claim 1, wherein:

said step of receiving electromagnetic pulses includes scanning a receive beam within a first region; and said step of measuring a relative position includes compensating for relative movement between said corresponding emitter and said receive beam.

8. The method, as claimed in claim 1, wherein:

said first location is on board a satellite revolving about the earth.

9. The method, as claimed in claim 1, wherein:

said first location is on board an airborne vehicle.

10. In a system for collecting information on emitters of electromagnetic energy in a first region, a method for processing pulses received from said first region, said method comprising the steps of:

receiving a first electromagnetic pulse from said first region at a first location;

determining an angle-of-arrival (AOA) of said first electromagnetic pulse; and associating said first electromagnetic pulse with a first emitter in said first region based on said AOA;

said step of associating includes transferring information relating to said first electromagnetic pulse to a memory location associated with said first emitter;

analyzing data within said memory location to determine whether said first emitter is an emitter of interest; and transmitting data from said memory location to a remote processing facility when said first emitter is found to be an emitter of interest.

11. The method, as claimed in claim 10, further comprising the step of:

extracting at least one transmission parameter value from said first electromagnetic pulse, wherein said step of analyzing includes analyzing said at least one transmission parameter value to determine whether said first emitter is an emitter of interest.

12. The method, as claimed in claim 10, wherein:

said step of determining includes using monopulse angle of arrival detection techniques.

13. A system for collecting information about a plurality of emitters of electromagnetic energy in a first region, said system comprising:

a sensor for sensing electromagnetic pulses transmitted by emitters in the first region, said sensor including an angle of arrival (AOA) determination unit for finding an AOA for each of the electromagnetic pulses, a plurality of AOA memory bins, and a sorter for sorting electromagnetic pulse information into the plurality of AOA memory bins based on AOA;

a processing facility remote from said sensor for processing emitter data collected by said sensor; and a communication link between said sensor and said processing facility for use in transmitting electromagnetic pulse information stored within said plurality of AOA memory bins to said processing facility for further processing.

14. The system, as claimed in claim 13, wherein:

said sensor is located within a satellite orbiting the earth.

15. The system, as claimed in claim 14, wherein:

said processing facility is ground based.

16. The system, as claimed in claim 13, wherein:

said communication link includes a satellite downlink.

17. The system, as claimed in claim 13, wherein:

said sensor includes an analyzer for analyzing electromagnetic pulse information stored within each of said plurality of AOA memory bins to determine whether said electromagnetic pulse information corresponds to an emitter of interest.

18. The system, as claimed in claim 17, wherein:

said analyzer transfers electromagnetic pulse information from a first AOA memory bin to said communication link for delivery to said processing facility only if said electromagnetic pulse information corresponds to an emitter of interest.

19. The system, as claimed in claim 13, wherein:

said AOA determination unit compensates for relative motion between a receive beam of said sensor and a source of a first electromagnetic pulse when determining an AOA for the first electromagnetic pulse.

* * * * *